(12) United States Patent
Wechs (10) Patent No.: US 9,068,627 B2
(45) Date of Patent: Jun. 30, 2015

(54) TRANSMISSION FOR A MOTOR-VEHICLE (71) Applicant: ZF Friedrichshafen AG, Friedrichshafen (DE)

(72) Inventor: Michael Wechs, Sigmarszell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 134 days.

(21) Appl. No.: 13/758,014

(22) Filed: Feb. 4, 2013

(65) Prior Publication Data
US 2013/0213165 A1 Aug. 22, 2013

(30) Foreign Application Priority Data

Feb. 21, 2012 (DE) .................. 10 2012 202 652

(51) Int. Cl.
*F16H 3/08* (2006.01)
*F16H 3/00* (2006.01)
*F16H 3/097* (2006.01)

(52) U.S. Cl.
CPC ............ *F16H 3/08* (2013.01); *Y10T 74/19233* (2015.01); *Y10T 74/19251* (2015.01); *F16H 3/006* (2013.01); *F16H 3/097* (2013.01); *F16H 2200/0052* (2013.01)

(58) Field of Classification Search
USPC .................................................. 74/330, 331
See application file for complete search history.

(56) References Cited

U.S. PATENT DOCUMENTS

| 4,658,663 | A * | 4/1987 | Hiraiwa | 74/359 |
| 6,209,406 | B1 * | 4/2001 | Sperber et al. | 74/330 |
| 7,040,186 | B2 * | 5/2006 | Pollak | 74/330 |
| 7,231,843 | B2 * | 6/2007 | Gumpoltsberger et al. | 74/329 |
| 7,472,617 | B2 * | 1/2009 | Nicklass | 74/340 |
| 2004/0093972 | A1 * | 5/2004 | Gumpoltsberger et al. | 74/325 |
| 2011/0030488 | A1 | 2/2011 | Gumpoltsberger et al. | |

FOREIGN PATENT DOCUMENTS

| DE | 10310472 A1 | 10/2003 |
| DE | 10 2006 054 281 A1 | 6/2008 |
| DE | 102009020550 A1 | 11/2010 |
| DE | 10 2010 030 569 A1 | 12/2011 |
| WO | 2012/000706 A1 | 1/2012 |

OTHER PUBLICATIONS

Swedish Office Action issued in corresponding Swedish Patent Application No. 1350175-4 mailed Jan. 15, 2015.

* cited by examiner

*Primary Examiner* — Ha D Ho
(74) *Attorney, Agent, or Firm* — Michael J. Bujold; Davis & Bujold, P.L.L.C.

(57) ABSTRACT

A dual clutch transmission for a motor vehicle which comprises at least two transmission parts and each transmission part comprise at least one input shaft. Drive is outputted from the transmission parts via a common output shaft. The at least one input shaft is arranged on a main axis and the output shaft is arranged on the main axis or a parallel secondary axis. An intermediate transmission has at least one countershaft that is arranged on the secondary axis. At least one of the input shafts can be connected to the output shaft via at least two gear planes and/or at least one shifting element. At least three shifting mechanisms are provided and at least one shifting mechanism is arranged on each of the main and the secondary axes such that one of the at least two gear planes is arranged between two of the at least three shifting mechanisms.

19 Claims, 4 Drawing Sheets

Fig. 1

| | K1 | K2 | S1 | S2 | S3 | S4 | S5 | S6 | S7 | S8 |
|---|---|---|---|---|---|---|---|---|---|---|
| 1 | X | | X | | X | | X | | | |
| 2 | | X | X | | | | | | | |
| 3 | X | | | | | | | | X | |
| 4 | | X | | X | | X | | | | |
| 5 | | X | | X | X | | | | | X |
| 6 | | | | | | | | | | |
| R | X | | | | | | | X | | |

TRANSMISSION FOR A MOTOR-VEHICLE

This application claims priority from German patent application serial no. 10 2012 202 652.5 filed Feb. 21, 2012.

FIELD OF THE INVENTION

The invention concerns a transmission, in particular a dual clutch transmission for a motor vehicle, which comprises at least two part-transmissions, each part-transmission having at least one input shaft and such that an output shaft is arranged as the drive output shaft of both part-transmissions, wherein the at least one input shaft is arranged on a main axis and the drive output shaft is arranged on the main axis or on a secondary axis, in particular one parallel to the main axis, and wherein an intermediate transmission is configured with at least one countershaft, such that the at least one countershaft is arranged on the secondary axis, and wherein at least one of the input shafts can be connected to the output shaft by means of at least two gear planes and/or at least one shifting element.

BACKGROUND OF THE INVENTION

Such transmissions for a motor vehicle are designed, inter alia, as so-termed dual clutch transmissions in which the input shafts of the two part-transmissions can each be connected by way of a respective, associated power-shifting element to a drive mechanism, for example an internal combustion engine or an electric motor, wherein the two power-shifting elements are combined in the form of a dual clutch. The gear steps that can be obtained by means of such a transmission are then distributed alternately between the two part-transmissions, so that, for example, one part-transmission produces the even-numbered gears and the corresponding other part-transmission produces the odd-numbered gears. It is also known to obtain the individual gear steps by means of one or more gear stages or planes, each having different gear ratios. By means of corresponding shifting elements these can be connected into the force or torque flow between the drive input and the drive output, so that a corresponding, desired gear ratio between the drive input and the drive output of the transmission is obtained in each case.

By virtue of the alternating distribution of the gears between the two part-transmissions it is possible, while driving in a gear associated with one of the part-transmissions, to already preselect a next gear in the respective other part-transmission by appropriate actuation of the shifting mechanisms, so that an eventual change to the next gear is effected by opening the power-shifting element of the one part-transmission and shortly afterward closing the power-shifting element of the other part-transmission. In this way the gears or gear steps of the transmission can be shifted under load, which improves the acceleration ability of the motor vehicle by virtue of a gear change effected essentially without interruption of the traction force and enables more comfortable shifting processes for a driver of the vehicle.

Such dual clutch transmissions can also be designed with an intermediate transmission additional to the drive input and output, so enabling a more compact structure in the axial direction.

DE 10 2006 054 281 A1 has made known a transmission of this type for a motor vehicle, in the form of a dual clutch transmission. The dual clutch transmission has two part-transmissions, each with an input shaft. By connecting the respective input shafts in each case by means of a power-shifting element the two part-transmissions can each be connected in alternation into a force or torque flow from a drive input to a drive output, the input shaft of the first part-transmission being made as a central transmission shaft whereas the input shaft of the second part-transmission is made as a hollow transmission shaft. In addition an output shaft is provided, which forms the drive output of both part-transmissions so that a rotary movement of the drive input can be transmitted to the drive output via a plurality of gear ratio steps, and the force and torque flow passes via an intermediate transmission. In this case at least two gear planes are engaged in the force and torque flow by the actuation of associated shifting elements, so that a number of gear ratio steps can be obtained by combining the actuation of the shifting elements and the force and torque flow by way of appropriate gear planes. Likewise, by actuating appropriate shifting elements the rotary movement of the drive input can be transmitted to an output shaft of the drive output without geared conversion.

SUMMARY OF THE INVENTION

Thus, an objective of the present invention is to make available a transmission for a motor vehicle, which has good power shifting ability and good hybridization ability. Moreover, an objective of the present invention is to provide a transmission for a motor vehicle, which can be produced simply and cost-effectively and at the same time enables reliable transmission of torques between the drive input and the drive output. A further objective of the present invention is to indicate an alternative transmission for a motor vehicle.

The present invention achieves these objectives with a transmission, in particular a dual clutch transmission for a motor vehicle, which comprises at least two part-transmissions, each part-transmission having at least one input shaft and wherein an output shaft is arranged as the drive output shaft of both part-transmissions, wherein the at least one input shaft is arranged on a main axis and the drive output shaft on the main axis or on a secondary axis, in particular one parallel to the main axis, and wherein an intermediate transmission with at least one countershaft is provided, the at least one countershaft being arranged on the secondary axis, and wherein at least one of the input shafts can be connected by means of at least two gear planes and/or at least one shifting element to the output shaft, wherein N shifting mechanisms are provided, N being an integer larger than or equal to three, at least one shifting mechanism being arranged on the main axis and at least one shifting mechanism on the secondary axis, in such manner that in each case one of the at least two gear planes is arranged, respectively, between two of the at least three shifting mechanisms.

One of the advantages achieved by this is that it enables a reduction of the mechanical spread by winding the first forward gear of the transmission. A further advantage is that the transmission has good power-shifting ability and good hybridization ability.

In the description and particularly in the claims, the term "gear stage" or "gear plane" is preferably understood to mean two mutually co-operating transmission elements for the transmission of torques from one of the transmission elements to the other transmission element, which preferably produce a step-down or step-up ratio in particular for shafts which, in particular, co-operate with the transmission elements in the transmission.

In the description and particularly in the claims, the term "shifting element" is preferably understood to mean a device which can be at least in an open and a closed condition, such that in the open condition the device can transmit no torque whereas in the closed condition the device can transmit a torque between two devices that co-operate with the shifting element.

In the description and particularly in the claims, the term "shifting mechanism" is preferably understood to mean at least a shifting element and at least a shifting element actuating device for actuating the at least one shifting element.

In the description and particularly in the claims, the term "transmission element" is preferably understood to mean a device by means of which torque can be transmitted. In this context transmission elements can be in the form of wheels, preferably gearwheels, and in particular spur gears, bevel gears, worm gears or the like.

In the description and particularly in the claims, the term "adjacent" when referring to shifting elements and/or shifting mechanisms is preferably understood to mean shifting mechanisms and/or shifting elements which, on the main axis or the secondary axis, are arranged directly next to one another along the axis concerned and are such that in each case one of the shifting elements of the shifting mechanisms is connected by a shaft directly to the respective other shifting element of the adjacent shifting mechanism.

Expediently, the first of the at least two gear planes, which is arranged in the transmission upstream from the other gear plane in relation to the torque flow, is arranged between the shifting mechanism on the secondary axis and the at least one shifting mechanism on the main axis. One of the advantages this achieves is that the shifting mechanisms adjacent to one gear plane in the axial direction can be arranged along the main axis and the secondary axis closer to one another, which overall enables a reduction of the length of the transmission along the main and the secondary axes.

Advantageously, one gear plane is formed as a drive output constant. The advantage achieved is that it enables a reliable force and torque transmission from the drive input by way of at least one input shaft through the transmission to the output shaft for the drive output. When the gear plane is designed as a drive output constant the respective transmission elements, in particular in the form of gearwheels, are arranged fixed on their respective shafts.

Expediently, the shifting mechanism positioned directly on the drive input side is arranged on the secondary axis. An advantage of this is that additional space is made available in the area of the input shafts, since the next-adjacent shifting mechanisms are arranged not on the main axis but on the secondary axis. On the one hand this further increases flexibility, particularly when fitting the transmission into different vehicles, and on the other hand the transmission can be made even more compact.

Advantageously, at least two of the input shafts are arranged coaxially with one another and/or at least two of the countershafts are arranged coaxially with one another. This reduces the structural space required for the two input shafts and/or for the at least two countershafts, and thus also for the corresponding transmission as a whole, so that the transmission can be used in a motor vehicle even when space is restricted. Likewise, in this way several countershafts can be provided, which enables numerous gears or gear steps to be obtained with the transmission.

Expediently, the number N is equal to four. Thus, if N=4 shifting mechanisms are provided, then at least a plurality of forward gear steps can be obtained with the transmission while at the same time the transmission can be made compact and can therefore be used in many vehicles.

Advantageously, at least one of the input shafts and/or at least one of the countershafts is made as a hollow shaft and the respective other shaft as a solid shaft. This enables a particularly space-saving arrangement of the two input shafts and/or the two countershafts, since the input shaft or countershaft made as a hollow shaft can be arranged coaxially with and parallel to the input shaft or countershaft made as a solid shaft. In this solid shaft or hollow shaft design, respective transmission elements that have to be connected fixed to the solid or hollow shaft can be made integrally with the shaft concerned, and thus inexpensively. This eliminates the need for time-consuming and hence cost-intensive fixing of each transmission element onto its corresponding shaft.

Expediently, at least three gear planes can be connected by means of at least one shifting element on the main axis to at least one of the input shafts. In this way transmission elements of more than one gear plane can be connected or coupled to at least one of the input shafts, which enables a plurality of possible gears or gear steps to be obtained by means of the transmission, without the need for a large number of components to achieve that.

Advantageously, at least one gear plane is designed as a reversing gear stage. By means of the at least one reversing gear stage the rotation direction of the output shaft relative to one of the input shafts can be reversed, so that a reverse gear for a vehicle can be provided, which substantially increases flexibility in relation to the use of the transmission in a variety of vehicles.

Advantageously, the reversing gear stage, as the first gear plane, is arranged downstream from the at least three shifting mechanisms in relation to the torque flow. An advantage of this is that it enables a direct transmission of force and torque by way of the reversing gear stage to the intermediate transmission, so that when the shifting mechanism for the reversing gear stage is actuated, large torques can be transmitted. Furthermore, thanks to the arrangement in the area of the drive input side, access to the reversing gear stage is made more simple, for example for maintenance purposes.

Expediently, for hybridizing the transmission an electric machine is connected to at least one gear plane and/or to at least one countershaft and/or to at least one of the input shafts.

One of the advantages achieved thereby is that the transmission can also be used in hybrid vehicles in which both an electric machine and an internal combustion engine are intended to co-operate with the transmission for the transfer of forces to the drive input of the hybrid vehicle. In this case the at least one electric machine can be connected to at least one of the input shafts or to the output shaft or to at least one of the countershafts. The electric machine can also be connected to a transmission element in the form of a fixed wheel or a loose wheel of one of the gear planes.

The electric machine can also be connected to an additional fixed wheel, i.e. a wheel connected fixed to one of the shafts of the transmission. In that case it is particularly advantageous to form the connection of the electric machine to the transmission by means of at least one shifting element, in particular to a transmission element of a gear plane. The advantage given by this first connection possibility is that it enables a so-termed continuous charging ability and electric driving without drag losses in the transmission. Concerning this, explicit reference is made to the disclosure content of DE 10 2010 030 569 A1: in that case a first input shaft can be coupled with a power-shifting element. A second input shaft, in particular one which is arranged coaxially with the first input shaft, is connected directly to a rotor of the electric machine for driving it. In this way two parallel force transmission branches on the input side can be coupled with one another.

A second option for connecting or coupling the electric machine to the transmission is enabled by arranging a planetary gear system in the transmission: in this case an appropriate shifting element, in particular in the form of a separator clutch, can be used to couple an internal combustion engine to a first input shaft. The electric machine engages on the one hand with a second input shaft and on the other hand with the first input shaft of the transmission by way of a planetary gear system. When the separator clutch is actuated, i.e. closed, the internal combustion engine is also coupled with the second input shaft by the planetary gear system. The planetary gear system, comprising a sun gear, a ring gear, planetary gears and a planetary carrier, is in this case designed such that, and co-operates with the internal combustion engine and the electric machine in such manner that, the planetary carrier engages with the second input shaft. The electric machine is coupled to the sun gear of the planetary gear system. In addition a further shifting element in the form of a bridging shifting element can be provided, which co-operates with the planetary gear system in such manner that when the bridging shifting element is actuated there is a rotationally fixed connection between the electric machine, the first input shaft and the second input shaft, while in contrast, when the bridging shifting element is not actuated, i.e. when it is open, the rotationally fixed connection between the electric machine and the first and second input shafts is not formed so that, in particular, there is no speed equalization between the two input shafts.

If a further shifting element is arranged between the shifting element that serves to connect the internal combustion engine to the first input shaft and the bridging shifting element, then by means of this further shifting element, particularly one in the form of a double shifting element, both the first connection possibility and the second connection possibility are enabled by actuating the further shifting element.

Advantageously, the electric machine is arranged on at least one of the gear planes which is connected to the countershaft in the form of a hollow shaft. This enables particularly simple connection or coupling of the electric machine to the transmission, and thus a reliable transmission of force and torque from the electric machine to the transmission and in particular ultimately to the drive output shaft.

Expediently, transmission elements of at least two gear planes on the secondary axis are connected fixed to a countershaft in the form of a hollow shaft. In this way the transmission elements together with the countershaft can be produced inexpensively, in particular by an integrated formation of the transmission elements with the corresponding countershaft in the form of a hollow shaft. Moreover, an exceptionally reliable connection or coupling of an electric machine to the transmission or to the corresponding transmission elements is possible.

Advantageously, the N shifting mechanisms and the at least two gear planes are arranged so that at least six forward gears and at least one reverse gear can be obtained with the transmission. In this way the transmission can provide a sufficient number of forward and reverse gear steps for numerous vehicles, in particular both for passenger vehicles and for utility vehicles.

Advantageously, the shifting element for actuating the reversing gear step is arranged on the main axis. One of the advantages achieved thereby is that on the one hand it enables a direct transmission of torques to the at least one gear plane designed as the reversing gear step. On the other hand, it also enables more than one reversing gear to be provided by the transmission by way of the intermediate transmission, so that the transmission can be used even more flexibly in many different types of vehicles.

Expediently, the shifting element for actuating the reversing gear is arranged in the shifting mechanism adjacent to the drive output side. One of the advantages achieved thereby is that the reversing gear stage is arranged in the area of the drive output and is therefore more easily accessible for maintenance purposes. A further advantage is that the production of the transmission as a whole is made easier since, in essence, apart from the gear plane designed as an output constant, the gear planes for the forward gears and the reverse gear are arranged along the main axis and the secondary axis in different areas, thereby avoiding a complicated, mixed arrangement of gear planes in the form of forward gear steps and reverse gear steps.

Advantageously, at least one gear plane can be coupled to both input shafts. This increases the flexibility of the transmission still more and at the same time enables extremely reliable transmission of forces and torques from the two input shafts via the at least one gear plane to the intermediate transmission.

Further important features and advantages of the invention emerge from the subordinate claims, the drawings and from the associated description of figures referring to the drawings.

It is understood that the features mentioned above and those still to be explained can be used not only in the specific combinations indicated, but also in other combinations or in isolation, without going beyond the scope of the present invention.

Preferred designs and embodiments of the invention are illustrated in the drawings and will be explained in greater detail in the description that follows, wherein the same indexes refer to the same, or similar, or functionally equivalent components or elements.

DETAILED DESCRIPTION OF THE PREFERRED EMBODIMENTS

Figure 1:
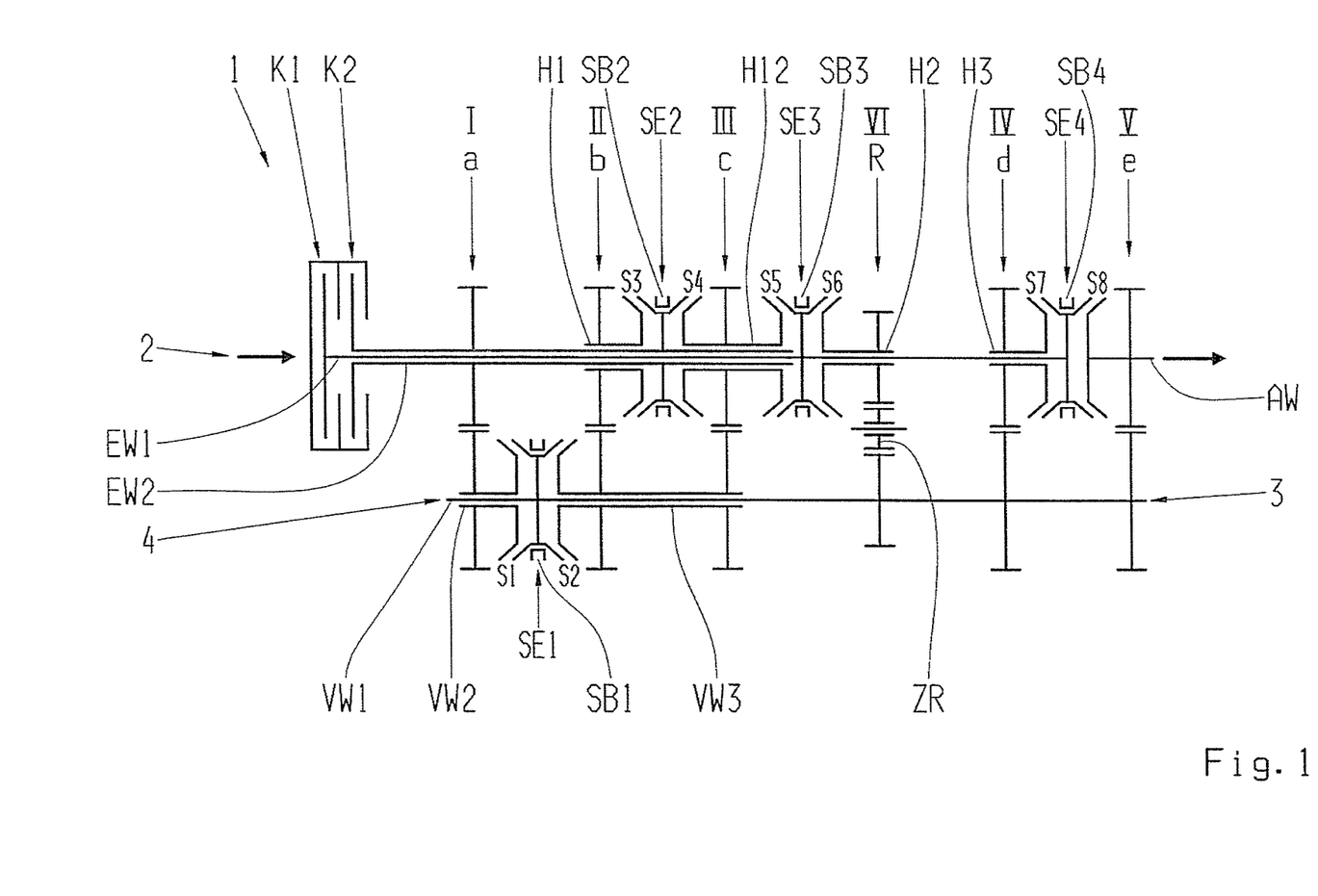
FIG. 1: A first embodiment of a transmission according to the present invention.

FIG. 1 shows a first embodiment of a transmission according to the present invention.

In FIG. 1 the index 1 denotes a transmission in the form of a dual clutch transmission. The dual clutch transmission 1 has two power-shifting elements in the form of clutches K1, K2. By means of the dual clutch K1, K2 the drive input side AN can be coupled or connected to the drive output side AB for the transmission of forces and torques. For this, the first clutch K1 is connected to a first input shaft EW1 and the second clutch K2 is connected to a second input shaft EW2. The second input shaft EW2 is made as a hollow shaft whereas the first input shaft EW1 is a solid shaft. In this case the two input shafts EW1, EW2 are arranged coaxially and parallel to one another.

Furthermore, the transmission 1 has a main axis 2, which on the downstream side of the drive input AN relative to the torque and force flow comprises, starting from the two clutches K1, K2, first a first gear plane I and a second gear plane II, and then a third shifting element S3, a fourth shifting element S4, a third gear plane III, a fifth shifting element S5, a sixth shifting element S6, a sixth gear plane VI, a fourth gear plane IV, a seventh shifting element S7, an eighth shifting element S8 and a fifth gear plane V. Each of the gear planes I, II, III, IV, V and VI comprises transmission elements, in particular in the form of gearwheels, each of them connected to a shaft of the transmission 1. By means of the eighth shifting element S8 the first input shaft EW1 can be coupled with or connected to an output shaft AW of the transmission 1. The output shaft AW is in the form of a solid shaft and is arranged on the main axis 2 coaxially with and parallel to the two input shafts EW1, EW2.

Parallel to the main axis 2 is arranged a secondary axis 3 for an intermediate transmission 4. In this case the intermediate transmission 4 comprises a first countershaft VW1 made as a solid shaft and two other countershafts VW2, VW3 each in the form of hollow shafts and arranged, respectively, over parts of the first countershaft VW1. The second countershaft VW2 and the third countershaft VW3 are arranged coaxially with and parallel to the first countershaft VW1, over the radially outer side thereof. On the radially outer side of the second countershaft VW2 is arranged a transmission element of the first gear plane I, which co-operates with a transmission element on the second input shaft EW2 to form the first gear plane I. On the third countershaft VW3 are arranged transmission elements of the second gear plane II and the third gear plane III. Between the secondary axis 3 and the main axis 2 the sixth gear plane VI, which is designed in the form of a reversing gear stage, has an intermediate gearwheel ZR for reversing the rotation direction so that with the same rotation direction of one of the input shafts EW1, EW2 a reversed rotation direction is produced by means of the output shaft AW for the provision of at least one reversing gear.

In this case the sequence of gear planes and shifting elements on the secondary axis 3, beginning on the drive input side AN, is as follows: first gear plane I, first shifting element S1, second shifting element S2, second gear plane II, third gear plane III, sixth gear plane VI, fourth gear plane IV, fifth gear plane V.

Below, the shifting elements S1, S2, S3, S4, S5, S6, S7 and S8 will now be described. The first shifting element S1 is arranged on the secondary axis 3 and is connected on the one hand to the first countershaft VW1 and on the other hand to the second countershaft VW2, and when actuated, forms a connection between the first and second countershafts VW1, VW2 for the transmission of force and torques. As already explained, on the second countershaft VW2 there is arranged a transmission element that co-operates with a transmission element on the second input shaft EW2 to form the first gear plane I. The second shifting element S2 is arranged on the secondary axis 3 and connected on the one hand to the first countershaft VW1 and on the other hand to the third countershaft VW3, and when actuated, forms a force and torque transmitting connection between the first and third countershafts VW1, VW3. On the third countershaft VW3 are arranged transmission elements which co-operate with corresponding transmission elements on the main axis 2 to form the second gear plane II and the third gear plane III.

The third shifting element S3 is arranged on the main axis 2 and is connected on the one hand to the second input shaft EW2 and on the other hand to a first hollow shaft H1 arranged coaxially with and parallel to the second input shaft EW2. When actuated, the third shifting element S3 produces a force and torque transmission connection between the second input shaft EW2 and the first hollow shaft H1. On the first hollow shaft H1 is arranged a transmission element which co-operates with a transmission element on the third countershaft VW3 on the secondary axis 3 to form the second gear plane II. The fourth shifting element S4 is connected on the one hand to the second input shaft EW2 and on the other hand to a second hollow shaft H12 arranged coaxially with and parallel to the second input shaft EW2. When actuated, the fourth shifting element S4 thus forms a force and torque transmitting connection between the second input shaft EW2 and the second hollow shaft H12. On the second hollow shaft H12 is arranged a transmission element which co-operates with a transmission element on the third countershaft VW3 to form the third gear plane III.

The fifth shifting element S5 is connected on the one hand to the first input shaft EW1 and on the other hand to the second hollow shaft H12, and when actuated, forms a force and torque transmitting connection between the first input shaft EW1 and the second hollow shaft H12. The sixth shifting element S6 is connected on the one hand to the first input shaft EW1 and on the other hand to a third hollow shaft H2 arranged coaxially with and parallel to the first input shaft EW1. When actuated, the sixth shifting element S6 forms a force and torque transmitting connection between the first input shaft EW1 and the third hollow shaft H2. On the third hollow shaft H2 is arranged a transmission element which co-operates with an intermediate gearwheel ZR and a transmission element on the first countershaft VW1, on the secondary axis 3, to form the sixth gear plane VI forming the reversing gear stage.

The seventh shifting element S7 is connected on the one hand to the first input shaft EW1 and on the other hand to a fourth hollow shaft H3 arranged coaxially with and parallel to the first input shaft EW1. When actuated, the seventh shifting element S7 forms a force and torque transmitting connection between the first input shaft EW1 and the fourth hollow shaft H3. On the fourth hollow shaft H3 is arranged a transmission element which co-operates with a transmission element on the first countershaft VW1 on the secondary axis 3 to form the fourth gear plane IV. The eighth shifting element S8 is connected on the one hand to the first input shaft EW1 and on the other hand to the drive output shaft AW. Thus, when actuated the eighth shifting element S8 forms a force and torque transmitting connection between the first input shaft EW1 and the output shaft AW. On the output shaft AW is arranged a transmission element which co-operates with a transmission element on the first countershaft VW1 to form the fifth gear plane V. The two transmission elements of the fifth gear plane V, on the main axis 2 and on the secondary axis 3, are arranged fixed on their respective shafts so that the fifth gear plane V forms a drive output constant.

The first shifting element S1 and the second shifting element S2 on the secondary axis 3 are combined in a common, first shifting mechanism SE1 and can be actuated by means of a common, first shifting element actuating mechanism SB1. The third shifting element S3 and the fourth shifting element S4 on the main axis 2 are arranged in a common, second shifting mechanism SE2 and can be actuated by a common, second shifting element actuating mechanism SB2. The fifth shifting element S5 and the sixth shifting element S6 are combined in a common, third shifting mechanism SE3 and can be actuated by a common, third shifting element actuating mechanism SB3. The seventh shifting element S7 and the eighth shifting element S8 are arranged in a fourth shifting mechanism SE4 and can be actuated by a fourth shifting element actuating mechanism SB4.

The shifting element actuating mechanisms SB1, SB2, SB3 and SB4 or the shifting mechanisms SE1, SE2, SE3 and SE4 can be made in the form of dual synchronizers.

Overall, the transmission 1 shown in FIG. 1 comprises two input shafts EW1, EW2, one made as a solid shaft and the other, coaxial and parallel thereto, made as a hollow shaft on the main axis 2. On the secondary axis 3 parallel to the main axis 2 are arranged three countershafts VW1, VW2 and VW3, the first countershaft VW1 being a solid shaft and the other two countershafts VW2 and VW3 being arranged coaxially with and parallel thereto and in each case being made as hollow shafts. Furthermore, the drive output shaft AW is a solid shaft arranged coaxially with and parallel to the input shafts EW1, EW2 and on the main axis 2. The transmission 1 of FIG. 1 has six gear planes I, II, III, IV, V and VI, the sixth gear plane VI being formed as a reversing gear stage. In particular, all of the gear planes I to VI are in the form of spur gear stages with discrete gear ratios. Each gear plane I, II, III, IV, V and VI comprises two respective transmission elements, in particular in the form of gearwheels. The reversing gear stage VI has an additional gearwheel in the form of an intermediate gear ZR between the main axis 2 and the secondary axis 3. Thus, there are a total of thirteen transmission elements, specifically in the form of gearwheels.

In total, with the embodiment of the transmission 1 shown in FIG. 1 at least six forward gears and at least one reverse gear can be obtained.

Figure 2:
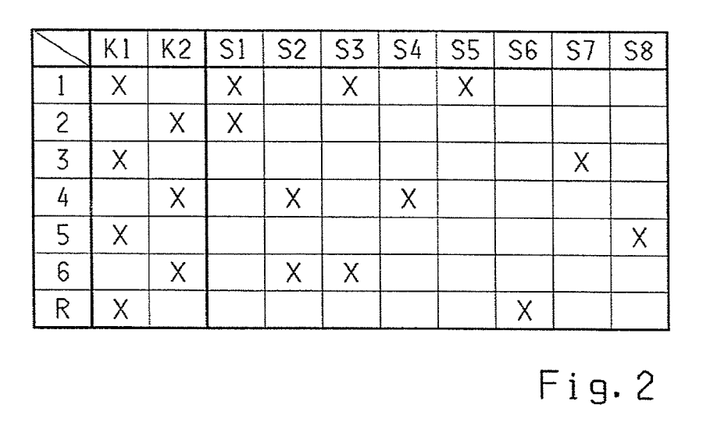
FIG. 2: A shifting matrix for a transmission according to the first embodiment shown in FIG. 1.

FIG. 2 shows a shifting matrix for a transmission according to the first embodiment represented in FIG. 1.

FIG. 2 shows a shifting matrix for a transmission 1 according to FIG. 1. Horizontally, there are columns each for a shifting element S1 to S8 and for the two clutches K1 and K2. Perpendicularly and downward are shown first the six forward gears, indexed 1 to 6, and a reverse gear stage indexed R. The cells left empty in the shifting matrix, as for example those corresponding to the shifting elements S2, S4, S6, S7 and S8 in the first forward gear 1, indicate that the shifting element concerned is open, i.e. the shifting element is not transmitting any forces or torque between the shafts connected to the shifting element. A cell marked with a cross denotes a corresponding closed shifting element, i.e. in the shifting matrix the shifting elements S1, S3 and S5 for the forward gear 1.

To obtain the first gear with the transmission 1 according to FIG. 1, the clutch K1 is closed, the clutch K2 is open, the shifting elements S2, S4, S6, S7 and S8 are open, and the shifting elements S1, S3 and S5 are closed. To obtain the second gear the clutch K1 is open, the clutch K2 is closed, the shifting elements S2, S3, S4, S5, S6, S7 and S8 are open, and the shifting element S1 is closed. To obtain the third gear the clutch K1 is closed, the clutch K2 is open, the shifting elements S1, S2, S3, S4, S5, S6 and S8 are open, and the shifting element S7 is closed. To obtain the fourth gear the clutch K1 is open, the clutch K2 is closed, the shifting elements S1, S3, S5, S6, S7 and S8 are open, and the shifting elements S2 and S4 are closed. To obtain the fifth gear the clutch K1 is closed, the clutch K2 is open, the shifting elements S1, S2, S3, S4, S5, S6 and S7 are open, and the shifting element S8 is closed. To obtain the sixth gear the clutch K1 is open, the clutch K2 is closed, the shifting elements S1, S4, S5, S6, S7 and S8 are open, and the shifting elements S2 and S3 are closed. To obtain the reversing gear R the clutch K1 is closed, the clutch K2 is open, the shifting elements S1, S2, S3, S4, S5, S7 and S8 are open, and the shifting element S6 is closed.

Thus, in total, by means of the shifting matrix shown in FIG. 2 at least six forward gears and at least one reversing gear can be obtained with the transmission 1 according to FIG. 1.

Figure 3:
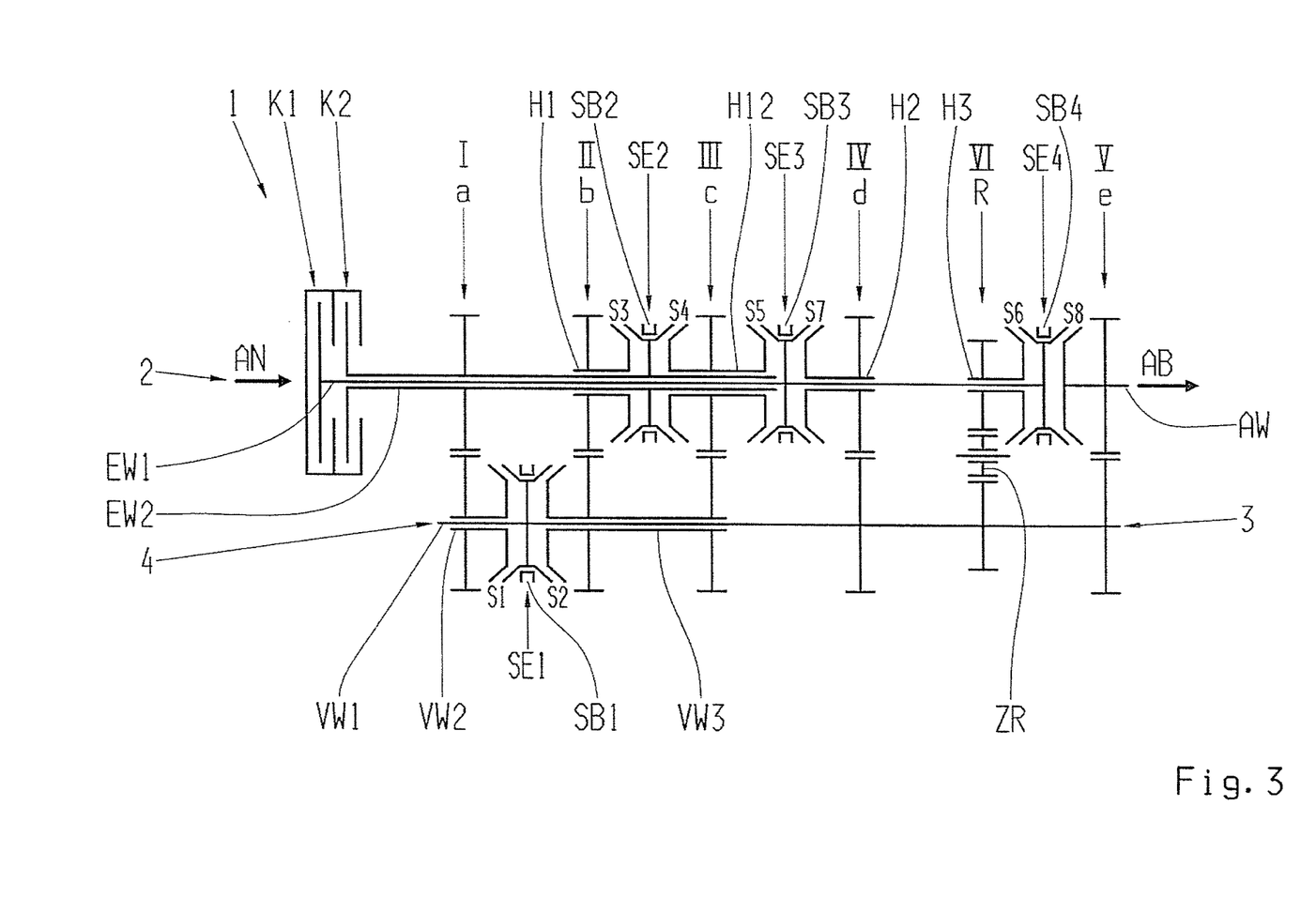
FIG. 3: A second embodiment of a transmission according to the present invention.

FIG. 3 shows a second embodiment of a transmission according to the present invention.

FIG. 3 shows a transmission 1 substantially like that of FIG. 1. In contrast to the transmission 1 of FIG. 1, however, in the transmission 1 according to FIG. 3 the respective positions of the fourth gear plane IV and the sixth gear plane VI along the main axis 2 and secondary axis 3 are exchanged. The transmission element on the main axis 2, of the fourth gear plane IV, is now connected to the third hollow shaft H2 and can be coupled by means of the seventh shifting elements 7 to the first input shaft EW1. In contrast to the transmission 1 of FIG. 1, the sixth shifting element S6 is now connected to the fourth hollow shaft H3. The transmission element of the fourth hollow shaft H3 co-operates with the intermediate gearwheel ZR and the transmission element on the first countershaft VW1 to form the sixth gear plane VI. Furthermore, the fifth shifting element S5 and the seventh shifting element S7 form the third shifting mechanism SE3 and can be actuated by means of the third shifting element actuating mechanism SB3. The sixth shifting element S6 and the eighth shifting element S8 now form the fourth shifting mechanism SE4 and can be actuated by means of the fourth shifting element actuating mechanism SB4.

Figure 4:
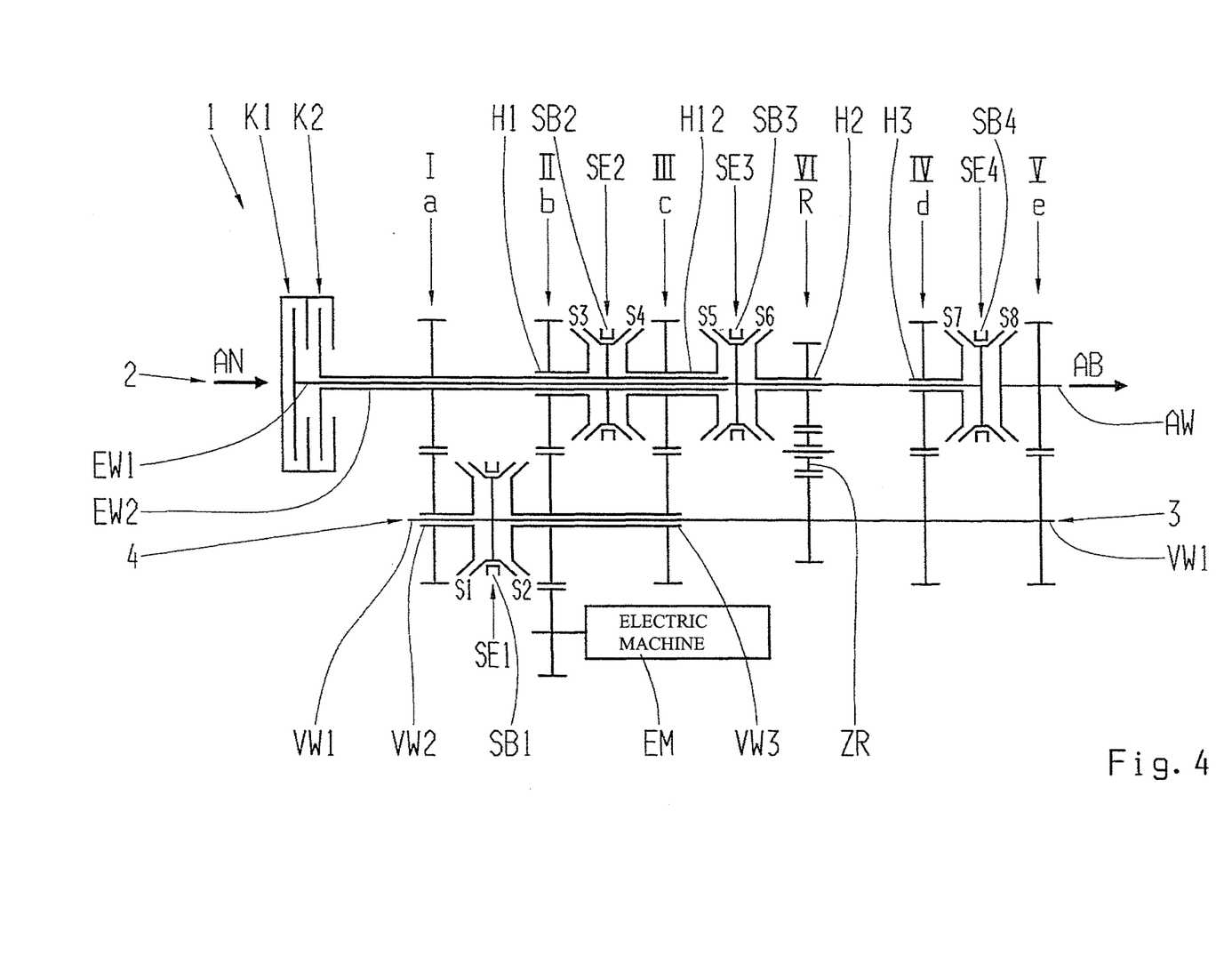
FIG. 4: A third embodiment of a transmission according to the present invention.

FIG. 4 shows a third embodiment of a transmission according to the present invention.

FIG. 4 shows a transmission 1 substantially like that of FIG. 1. In contrast to the transmission 1 of FIG. 1, the transmission 1 according to FIG. 4 comprises an electric machine EM for hybridizing the transmission 1. The electric machine EM is connected, by way of a shaft and a transmission element connected to the shaft, to the transmission element of the second gear plane II arranged on the secondary axis 3. In this way the electric machine EM can transmit force and torque to the transmission element of the second gear plane II on the second countershaft VW2 and thus achieve hybridization of the transmission 1 of FIG. 1. The connection or coupling of the electric machine EM to the transmission 1 can also take place by way of the transmission elements of the first and third gear plane I, III, i.e. via the transmission elements on the secondary axis 3 which are arranged on the second or third countershafts VW2, VW3 which are formed as hollow shafts.

Overall, the shifting elements S1 to S8 in the transmissions 1 according to FIGS. 1 to 4 can also be referred to as coupling devices and in particular can be formed as synchronizers. The shifting element actuating mechanisms SB1, SB2, SB3 and SB4 and the shifting mechanisms SE1, SE2, SE3 and SE4 can be designed as dual synchronizers. In particular in the transmissions 1 according to FIGS. 1 to 4 the transmission elements can be arranged on or connected both in a fixed manner or loosely on their respective shafts, in particular the input shafts EW1, EW2 and/or at least one of the countershafts VW1, VW2, VW3 and/or the hollow shafts H1, H12, H2, H3. The transmission elements can in particular be in the form of gearwheels, preferably spur gears, so that the gear planes I, II, III, IV, V and VI are spur gear stages. To provide various forward and reverse gears, i.e. various gear ratios, the spur gear stages and specifically their gearwheels can correspondingly have different gear ratios.

Furthermore the second gear plane II, the fourth gear plane IV and the sixth gear plane VI in the form of the reversing gear stage can be coupled by means of at least one shifting element with one of the input shafts EW1, EW2. The first gear plane I can be coupled with the first countershaft VW1 by means of at least one shifting element. The third gear plane III can be coupled to both input shafts EW1, EW2 by means of at least one shifting element. The first input shaft EW1, made as a solid shaft, can be coupled to the drive output shaft AW by means of at least one shifting element. The transmission elements of the second gear plane II and the third gear plane III on the secondary axis 3 are connected fixed to the third countershaft VW3, which is arranged coaxially with the first countershaft VW1 and is made as a hollow shaft, and can be coupled by at least one shifting element to the first countershaft VW1 made as a solid shaft. Moreover, the transmission elements of the fifth gear plane V are connected fixed both to the output shaft AW and to the first countershaft VW1. Thus, the fifth gear plane V is made as an output constant.

The shifting elements S1 to S8 of the transmissions 1 according to FIGS. 1 to 4 can also be referred to as coupling devices and, as already explained earlier, can in particular be designed as synchronizers. The first shifting element S1 of the first gear plane I, the second shifting element S2 of the second and third gear planes II, III, the third shifting element S3 of the second gear plane II, the fourth shifting element S4 of the third gear plane III, the fifth shifting element S5 of the third gear plane III, the sixth shifting element S6 of the sixth gear plane VI in the form of the reversing gear stage, the seventh shifting element S7 of the fourth gear plane IV and the eighth shifting element S8 can be associated with the two input shafts EW1, EW2 and the drive output shaft AW.

In summary, the present invention offers the advantage that the mechanical spread of the transmission is enabled by winding the first forward gear. A further advantage is that the transmission has good power-shifting ability and good hybridization ability. Another advantage is that with a total of six gear planes I to VI at least six forward gears and at least one reversing gear are provided by the transmission, with only eight shifting elements and/or only four actuators in the form of the shifting mechanisms SE1 to SE4 for actuating the eight shifting elements.

Although the present invention has been described above with reference to preferred example embodiments, it is not limited to these but can be modified in many ways.

The transmission 1 according to FIGS. 1 to 4 can be modified, while retaining the same function, by varying the positions of the gear planes and/or the shifting elements. For this, as mentioned earlier, the shifting elements can be associated with gear planes and shafts, in particular designed as synchronizers. Thus, the shifting matrix of FIG. 2 is not changed by a new arrangement of the gear planes and/or the shifting elements and/or the shifting mechanisms.

INDEXES

1 Transmission
2 Main axis
3 Secondary axis
4 Intermediate transmission
I, II, III, IV, V, VI Gear plane
AW Drive output shaft
EW1, EW2 Drive input shaft
H1, H12, H2, H3, H4 Hollow shaft
K1, K2 Clutch
S1, S2, S3, S4, S5, S6, S7, S8 Shifting element
SB1, SB2, SB3, SB4 Shifting element actuating mechanism
SE1, SE2, SE3, SE4 Shifting mechanism
VW1, VW2, VW3 Countershaft
ZR Intermediate gearwheel
AN Drive input
AB Drive output
EM Electric machine

The invention claimed is:

1. A transmission (1) for a motor vehicle, the transmission comprising:
at least two part-transmissions, each of the part-transmissions comprising at least one input shaft (EW1, EW2), and an output shaft being arranged as the drive output shaft (AW) of both of the at least two part-transmissions,
the at least one input shafts (EW1, EW2) being arranged on a main axis (2) and the drive output shaft (AW) being arranged either on the main axis (2) or on a secondary axis (3) which is parallel to the main axis (2),
an intermediate transmission (4) having at least one countershaft (VW1, VW2, VW3), and the at least one countershaft (VW1, VW2, VW3) being arranged on the secondary axis (3),
the at least one input shafts (EW1, EW2) being connectable to the drive output shaft (AW) by way of at least one of:
at least two gear planes (I, II, III, IV, V, VI), and
at least one shifting element (S1, S2, S3, S4, S5, S6, S7, S8),
at least three shifting mechanisms (SE1, SE2, SE3, SE4) being provided, and a second shifting mechanism (SE2, SE3, SE4) of the at least three shifting mechanisms being arranged on the main axis (2) and a first shifting mechanism (SE1) of the at least three shifting mechanisms being arranged on the secondary axis (3) such that, one of the at least two gear planes (II, III) is arranged between a first pair of the at least three shifting mechanisms (SE1, SE2; SE2, SE3) and the other of the at least two gear planes is arranged between another pair of the at least three shifting mechanisms; and
a first gear plane (II) of the at least two gear planes is arranged in the transmission (1) upstream from a second gear plan (III) of the at least two gear planes in relation to a direction of torque flow, and the first gear plane is arranged directly between the first shifting mechanism (SE1) arranged on the secondary axis (3) and the second shifting mechanism (SE2) arranged on the main axis (2).

2. The transmission according to claim 1, wherein one further gear plane (V) is formed as a drive output constant.

3. The transmission according to claim 1, wherein the first shifting mechanism (SE1) arranged on the secondary axis is arranged directly adjacent the first gear plane on a drive input side (AN) of the first gear plane.

4. The transmission according to claim 1, wherein each of the at least one the input shafts (EW1, EW2) are arranged coaxially with one another and at least two countershafts (VW1, VW2; VW1, VW3) are arranged coaxially with one another on the secondary axis.

5. The transmission according to claim 1, wherein the transmission comprises third and fourth shifting mechanisms (SE1, SE2, SE3, SE4).

6. The transmission according to claim 1, wherein at least one of:
a second input shaft of the at least one input shafts (EW1, EW2) and a second countershaft of the at least one countershafts (VW1, VW2, VW3) are hollow shafts; and
a first input shaft of the at least one input shafts (EW1, EW2) and a first countershaft of the at least one countershafts (VW1, VW2, VW3) are solid shafts.

7. The transmission according to claim 1, wherein at least three gear planes (II, IV, VI) are connectable by at least one shifting element (S3, S6, S7) on the main axis (2) to the at least one input shafts (EW1, EW2).

8. The transmission according to claim 1, wherein at least one gear plane (VI) is a reversing gear stage.

9. The transmission according to claim 8, wherein the reversing gear stage (VI) is a third gear plane and is arranged downstream from the at least three shifting mechanisms (SE1, SE2, SE3) in relation to the direction of torque flow.

10. The transmission according to claim 1, wherein, to facilitate hybridization of the transmission (1), an electric machine (EM) is arranged on at least one of:
- at least one gear plane (I, II, III, IV, V, VI), and
- at least one countershaft (VW1, VW2, VW3), and
- one of the input shafts (EW1, EW2).

11. The transmission according to claim 10, wherein the electric machine (EM) is arranged on one of three gear planes (I, II, III) which are connected with a countershaft (VW2, VW3) which is a hollow shaft.

12. The transmission according to claim 1, wherein transmission elements of at least two gear planes (IV, V, VI) arranged on the secondary axis (3) are fixedly connected to a countershaft (VW2, VW3) which is made as a hollow shaft.

13. The transmission according to claim 1, wherein the at least three shifting mechanisms (SE1, SE2, SE3, SE4) and the at least two gear planes (I, II, III, IV, V, VI) are arranged so that at least six forward gears and at least one reverse gear stage (VI) are obtainable with the transmission (1).

14. The transmission according to claim 8, wherein the shifting element (S6), for actuating the reverse gear stage, is arranged on the main axis (2).

15. The transmission according to claim 8, wherein a first of the at least one shifting element (S6), actuates the reverse gear stage (VI), and is arranged in a fourth shifting mechanism (SE4) adjacent to the drive output shaft (AB).

16. The transmission according to claim 1, wherein the second gear plane (III) is couplable to both of the at least one input shafts (EW1, EW2).

17. At least one of a passenger vehicle and a utility vehicle in combination with a dual clutch transmission for a motor vehicle, having at least two part-transmissions, each part-transmission comprising at least one input shaft (EW1, EW2),
- wherein an output shaft is arranged as the drive output shaft (AW) of both of the at least two part-transmissions,
- the at least one input shafts (EW1, EW2) is arranged on a main axis (2) and the drive output shaft (AW) is arranged either on the main axis (2) or on a secondary axis (3) which is parallel to the main axis (2),
- an intermediate transmission (4) having at least one countershaft (VW1, VW2, VW3) that is arranged on the secondary axis (3),
- at least one of the at least one input shafts (EW1, EW2) is connectable to the drive output shaft (AW) by at least one of:
  - at least two gear planes (I, II, III, IV, V, VI), and
  - at least one shifting element (S1, 32, S3, S4, S5, S6, S7, S8),
- at least first, second, and third shifting mechanisms (SE1, SE2, SE3, SE4) are provided, and at least the second shifting mechanism (SE2, SE3, SE4) is arranged on the main axis (2) and at least the first shifting mechanism (SE1) is arranged on the secondary axis (3) in such manner that a first gear plane is arranged directly between the first and the second shifting mechanisms and a second gear plane is arranged directly between the second and the third shifting mechanisms, and the first gear plane is arranged upstream from the second gear plane with respect to torque flow through the at least one input shafts to the drive output shaft.

18. A dual clutch transmission for a motor vehicle, the transmission comprising:
- at least first and second part-transmissions, of the first part-transmission comprises an inner input shaft and the second part-transmissions comprises a hollow input shaft (EW1, EW2) which are both connectable to a common drive output shaft (AW) that outputs drive from the transmission;
- the first and the second input shafts (EW1, EW2) of the first and the second part-transmissions and the drive output shaft (AW) are coaxially aligned on a main axis (2), the first input shaft extends through the second input shaft;
- an intermediate transmission (4) comprises an inner countershaft and a hollow countershaft (VW1, VW2, VW3) that are coaxially aligned on a secondary axis (3) that is parallel to the main axis, the inner countershaft extends through the hollow countershaft;
- the inner and the hollow input shafts (EW1, EW2) of the first and the second part-transmissions are connectable to the drive output shaft (AW) by way of at least one of:
  - at least two gear planes (I, II, III, IV, V, VI), and
  - at least one shifting element (S, S2, S3, S4, S5, 56, S7, S8);
- a second and a third shifting mechanism (SE1, SE2, SE3, SE4) are coaxially aligned with the main axis (2) and a first shifting mechanism (SE1) is axially aligned with the secondary axis (3), such that, with respect to the main and the secondary axes, a first gear plane (II) is aligned directly between the first and the second shifting mechanisms and a second gear plane (III) is aligned directly between the second and the third shifting mechanisms, the first gear plane is arranged upstream from the second gear plane with respect to torque flow from the inner and the hollow input shafts to the drive output shaft.

19. The dual clutch transmission according to claim 18, wherein a fourth shifting mechanism directly couples one of the inner and the hollow input shafts to the drive output shaft, and the second, the third, and the fourth shift mechanisms are supported by the inner and the hollow input shafts.

* * * * *